Figure 3:
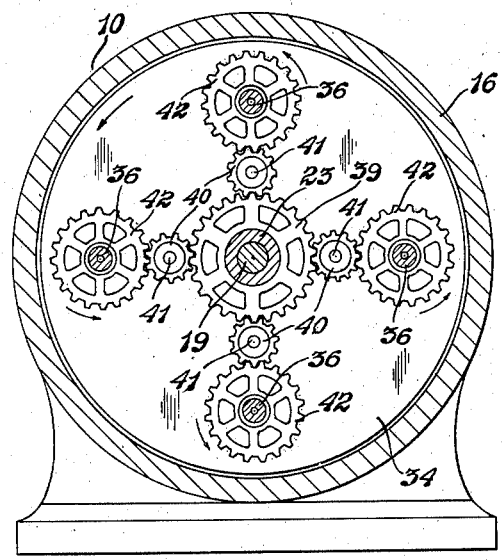

Dec. 7, 1948.  R. H. HERMAN  2,455,768
AUTOMATIC BEADING AND TRIMMING MACHINE
Filed June 21, 1946  2 Sheets-Sheet 1
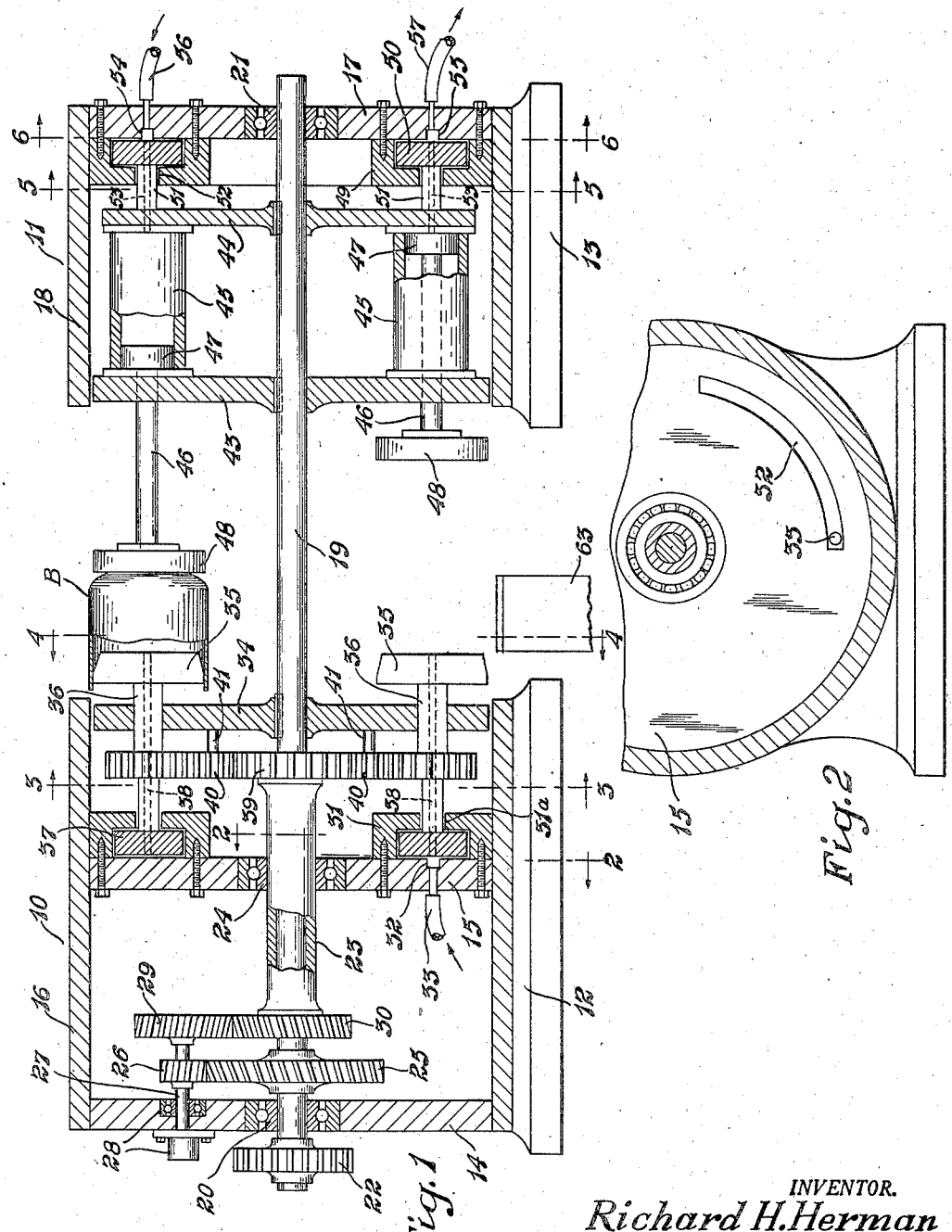
INVENTOR.
*Richard H. Herman*
BY
*Frease and Bishop*
ATTORNEYS Dec. 7, 1948.　　　　R. H. HERMAN　　　　2,455,768
AUTOMATIC BEADING AND TRIMMING MACHINE
Filed June 21, 1946　　　　　　　　　　2 Sheets-Sheet 2

INVENTOR.
Richard H. Herman
BY
Frease and Bishop
ATTORNEYS

Patented Dec. 7, 1948

2,455,768

UNITED STATES PATENT OFFICE 2,455,768

AUTOMATIC BEADING AND TRIMMING MACHINE

Richard H. Herman, Massillon, Ohio

Application June 21, 1946, Serial No. 678,381

8 Claims. (Cl. 153—2)

The invention relates to metal working apparatus and more particularly to an automatic machine for trimming and beading, or folding over, the edges of hollow sheet metal articles such as cooking utensils and the like.

Under present practice these operations are commonly performed upon a machine in which the articles are placed one at a time, and removed after the trimming and/or beading operation has been performed. This requires a considerable amount of time and adds materially to the labor cost of producing each article.

The object of the present invention is to provide a machine into which the articles may be continuously fed and having means for automatically positioning each article in the machine, trimming and beading the edges of the articles and ejecting the trimmed and beaded articles from the machine.

Another object is to provide including a rotating head stock upon which is mounted a plurality of rotating chucks and means for automatically forcing the open ends of the articles upon the chucks and holding them thereon, a trimming knife and a beading roll being located in the path of the rotating chucks for trimming and beading the edges of the articles as the chucks are rotated thereby.

A further object is to provide means for automatically ejecting the trimmed and beaded articles from the chucks.

A still further object is to provide fluid cylinder means for automatically forcing the open ends of the articles upon the chucks.

It is another object of the invention to provide an air blast for automatically ejecting the finished articles from the chucks.

Another object is to provide vacuum means for releasing the fluid cylinder means from contact with the articles before the air blast means is operated.

Still another object is to provide means for continuously conveying the articles to and from the machine.

A further object is to provide a machine comprising a head stock and a tail stock, a rotating shaft journalled longitudinally therethrough, a head stock disc fixed upon the shaft, a plurality of rotating chucks mounted upon the head stock disc, a tail stock disc fixed upon the shaft, a plurality of fluid cylinders carried by the head stock disc and individually aligned with the chucks on the head stock disc, means for automatically operating the fluid cylinders during each rotation of the shaft, and means for producing an air blast through each chuck at a predetermined point during each rotation of the head stock disc.

Figure 5:
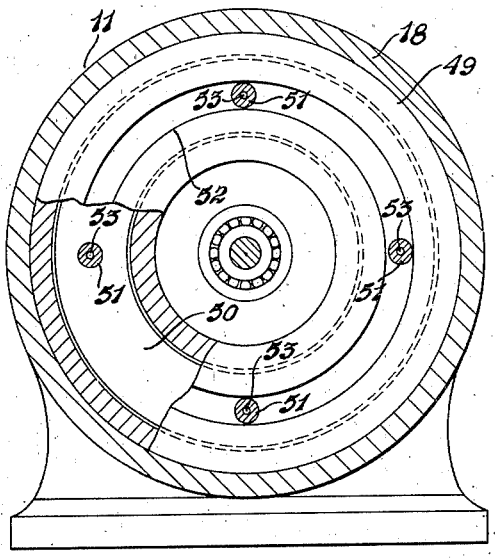
Figure 4:
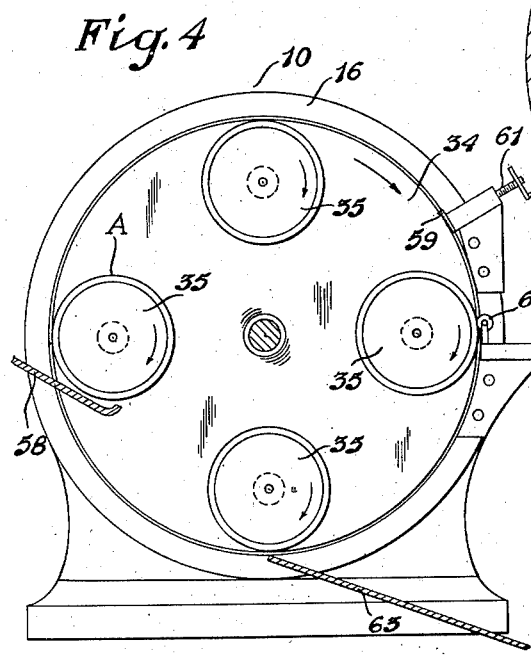
Figure 6:
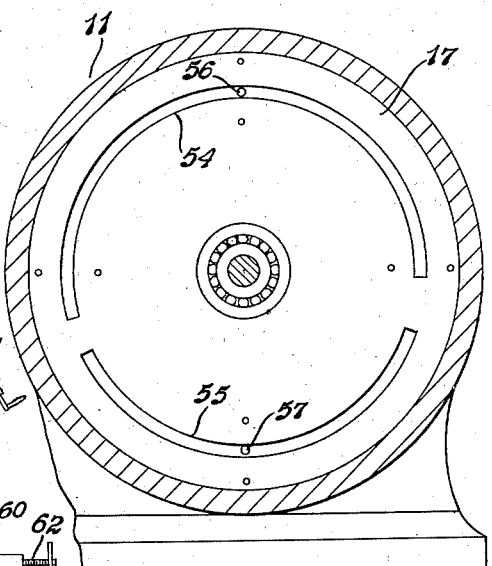

The above objects, together with others which will be apparent from the drawings and following description, or which may be later referred to, may be attained by constructing and operating the improved trimming and beading machine in the manner hereinafter described in detail and illustrated in the accompanying drawings, in which;

Figure 1 is a longitudinal, vertical section through the improved trimming and beading machine to which the invention pertains;

Fig. 2 a fragmentary, transverse sectional view showing the means for operating an air blast through the chucks for automatically removing the trimmed and beaded articles therefrom, taken on the line 2—2, Fig. 1;

Fig. 3 a section on the line 3—3, Fig. 1, showing the gearing for rotating the chucks upon the revolving head stock disc;

Fig. 4 a section on the line 4—4, Fig. 1, showing the revolving head stock disc with the rotating chucks thereon, the feed and discharge chutes and the trimming knife and beading roll;

Fig. 5 a section on the line 5—5, Fig. 1, with parts broken away, and;

Fig. 6 a section taken on the line 6—6, Fig. 1.

The machine comprises primarily the head stock assembly indicated generally at 10, and the tail stock assembly indicated generally at 11, which are located in longitudinal alignment and spaced from each other, and each of which may be mounted upon separate bases 12 and 13 respectively, which may be mounted upon a bed, table or other suitable horizontal support.

A rear wall 14 and a partition wall 15 are mounted in spaced relation upon the head stock base 12, and a cylindrical housing 16 surrounds these walls and is attached thereto and to the base 12, to house the gearing and other working parts of the head stock.

The tail stock base 13 has a similar rear wall 17 mounted thereon and a cylindrical housing 18 is fixed thereto and to the base 13 to house the working parts of the tail stock.

A drive shaft 19 is located longitudinally through the machine, being journalled in suitable bearings 20 and 21 in the end walls 14 and 17 respectively and being provided at one end with a gear, sprocket wheel, pulley or the like indicated at 22 by means of which it may be operatively connected to a motor or other prime mover for continuously rotating the shaft at suitable speed.

A tubular shaft 23 is journalled upon the shaft 19 within the head stock housing, said tubular shaft being journalled in suitable bearings 24 within the partition wall 15 of the head stock housing.

For the purpose of driving the tubular shaft 23 at a differential speed to the drive shaft 19, suitable gearing may be provided comprising a gear wheel 25 fixed upon the shaft 19 and meshing with a pinion 26 fixed upon the countershaft 27, which is journalled in bearings 28 carried by the end wall 14.

A gear wheel 29 is fixed upon the counter shaft and meshes with a gear wheel 30 fixed upon one end of the tubular shaft 23. By providing gears of suitable relative diameters any desired differential of speed may be attained.

An annular, channel cross sectional shape housing 31 is attached to the outer face of the partition wall 15 and an arcuate groove 32 is formed in said wall concentric with a portion of the housing 31 and communicating with the pipe or hose 33 which leads to a compressor, compressed air tank or other suitable source of compressed air for producing an air blast within the groove 32 as will be later described.

A disc 34 is fixed upon the shaft 19 at a point located adjacent to the inner end of the housing 16 and carries a plurality of revolving chucks 35 each of which is fixed upon a hollow shaft 36 journalled in the head stock disc 34 and in the ring 37 which is rotatably mounted within the channel shape annular housing 31.

A central bore 38 extends through each shaft 36 and through the corresponding chuck 35 and corresponding portion of the ring 37 so that in the rotation of the disc 34 as the inner end of the shaft 36 of each chuck passes through the lower portion of the annular slot 31a in the annular housing 31, in register with the groove 32 in the partition wall 15, the air blast from the pipe 33 will pass entirely through this bore 38.

For the purpose of rotating the chucks 35 upon the disc 34, gearing shown in Figs. 1 and 3 is provided. This gearing may comprise a gear wheel 39, fixed upon the tubular shaft 23 and meshing with pinions 40, journalled upon stud shafts 41 mounted in the head stock disc 34, and meshing in turn with the gear wheels 42 mounted upon the hollow shafts 36 of the chucks.

A pair of spaced discs 43 and 44 are fixed upon the shaft 19 within the tail stock housing 18 and the opposed faces of these discs are connected to opposite ends of a plurality of fluid cylinders 45 conforming in number and position to the chucks 35 upon the head stock, so that one of the cylinders 45 is axially aligned with each of the chucks 35.

A piston rod 46 is connected to the piston 47 of each cylinder and is slidably located through a suitable opening in the disc 43 and provided at its end with a head or ram 48.

A channel shape annular housing 49, similar to the housing 31, is attached to the inner face of the end wall 17, concentric with the discs 43 and 44, and has a ring 50 rotatably mounted therein and connected by the tubes 51 with the cylinders 45, said tubes being located through an annular slot 52 in the annular housing 49.

The central bore 53 of each of the pipes 51 extends through the adjacent head of the corresponding cylinder 45 and through the ring 50 as shown in Fig. 1.

A pair of grooves 54 and 55, concentric with the annular housing 49, are formed in the inner surfaces of the end wall 17, the upper groove 54 communicating with a pipe 56 leading from any suitable source of fluid pressure and the lower groove 55 communicating with a pipe 57 leading to any suitable means for producing a vacuum or suction.

For the purpose of continuously feeding articles to the machine, a downwardly inclined chute 58 is located adjacent to the chucks 35 terminating slightly below the center of the head stock disc 34 on the side of the machine opposite to the trimming knife 59 and beading roll 60, each of which may be of any conventional design and arranged to be radially adjusted as by the adjusting screws 61 and 62.

A downwardly inclined discharge chute 63 is provided beneath the bottom of the disc 34 to carry the finished articles away from the machine.

In the operation of the machine, cooking utensils or other hollow articles to be trimmed and beaded are continuously fed to the machine upon the feed chute 58 and as each utensil reaches the bottom of the chute it is picked up by one of the chucks 35 as it reaches the position indicated at A in Fig. 4.

At this point the air blast through the upper groove 54 of the tail stock end wall 17 operates the piston in the corresponding cylinder 45 pushing the open end of the utensil over the chuck and holding it in this position until the utensil has passed the trimming knife and beading roll 60 and being trimmed and beaded thereby. As shown in Fig. 1, a utensil indicated at B is shown held upon the uppermost chuck 35 by the corresponding piston head or ram 48.

As each cylinder 45 passes beyond the upper groove 54 and registers with the lower groove 55 the suction or vacuum through the pipe 57 will withdraw the piston to the position shown in the lowermost cylinder in Fig. 1 and at the same time the corresponding chuck 35 will have moved to register with the air blast groove 32 in the partition plate 15 of the head stock, the air blast passing through the central bore 38 and blowing the utensil loose from the chuck permitting it to roll down the discharge chute 63.

With this apparatus it will be seen that the trimming and beading of the open edges of cooking utensils and similar hollow sheet metal articles may be rapidly accomplished with a considerable reduction in the time required for performing such operations under present practice.

I claim:

1. A machine for trimming and beading the edges of hollow sheet metal articles, comprising a rotating head stock, a plurality of rotating chucks upon the head stock, a rotating tail stock, a plurality of longitudinally movable rams upon the tail stock axially aligned with the chucks upon the head stock, fluid means for operating each ram at a predetermined point to push the open end of a hollow sheet metal article over the corresponding chuck, trimming and beading means located at one side of the path of the chucks in positions to act on the open ends of said articles carried by the chucks, means for withdrawing each ram at a predetermined point beyond the trimming and beading means, and fluid means at said last named point for removing the articles from the chucks.

2. A machine for trimming and beading the edges of hollow sheet metal articles, comprising a rotating head stock, a plurality of rotating chucks upon the head stock, a rotating tail stock, a plurality of longitudinally movable rams upon the tail stock axially aligned with the chucks upon the head stock, fluid means for operating each ram at a predetermined point to push the open end of a hollow sheet metal article over the corresponding chuck, trimming and beading means located at one side of the path of the chucks in positions to act on the open ends of said articles carried by the chucks, suction means for withdrawing each ram at a predetermined point beyond the trimming and beading means, and fluid means at said last named point for removing the articles from the chucks.

3. A machine for trimming and beading the edges of hollow sheet metal articles, comprising a rotating head stock, a plurality of rotating chucks upon the head stock, a rotating tail stock, a plurality of longitudinally movable rams upon the tail stock axially aligned with the chucks upon the head stock, fluid means for operating each ram at a predetermined point to push the open end of a hollow sheet metal article over the corresponding chuck, trimming and beading means located at one side of the path of the chucks in positions to act on the open ends of said articles carried by the chucks, suction means for withdrawing each ram at a predetermined point beyond the trimming and beading means, and air blast means at said last named point for removing the articles from the chucks.

4. A machine for trimming and beading the edges of hollow sheet metal articles, comprising a head stock housing and a tail stock housing, a shaft journalled in said housings, means for rotating said shaft, a head stock disc fixed upon the shaft, a plurality of work receiving chucks rotatably mounted upon said disc, means for rotating said chucks upon the disc, a tail stock disc fixed upon the shaft, a plurality of longitudinally movable rams upon the tail stock disc axially aligned with the chucks upon the head stock disc, means for operating each ram at a predetermined point to push the open end of a hollow sheet metal article over the corresponding chuck, trimming and beading means located at one side of the path of the chucks in positions to act on the open ends of the articles carried by the chucks, means for withdrawing each ram at a predetermined point beyond the trimming and beading means, and means at said last named point for removing the articles from the chucks.

5. A machine for trimming and beading the edges of hollow sheet metal articles, comprising a head stock housing and a tail stock housing, a shaft journalled in said housings, means for rotating said shaft, a head stock disc fixed upon the shaft, a plurality of work receiving chucks rotatably mounted upon said disc, means for rotating said chucks upon the disc, a tail stock disc fixed upon the shaft, a plurality of fluid operated rams upon the tail stock disc axially aligned with the chucks upon the head stock disc, means for operating each ram at a predetermined point to push the open end of a hollow sheet metal article over the corresponding chuck, trimming and beading means located at one side of the path of the chucks in positions to act on the open ends of the articles carried by the chucks, means for withdrawing each ram at a predetermined point beyond the trimming and beading means, and air blast means at said last named point for removing the articles from the chucks.

6. A machine for trimming and beading the edges of hollow sheet metal articles, comprising a head stock housing and a tail stock housing, a shaft journalled in said housings, means for rotating said shaft, a head stock disc fixed upon the shaft, a plurality of work receiving chucks rotatably mounted upon said disc, means for rotating said chucks upon the disc, a tail stock disc fixed upon the shaft, a plurality of fluid operated rams upon the tail stock disc axially aligned with the chucks upon the head stock disc, means for operating each ram at a predetermined point to push the open end of a hollow sheet metal article over the corresponding chuck, trimming and beading means located at one side of the path of the chucks in positions to act on the open ends of the articles carried by the chucks, suction means for withdrawing each ram at a predetermined point beyond the trimming and beading means, and air blast means at said last named point for removing the articles from the chucks.

7. A machine for trimming and beading the edges of hollow sheet metal articles, comprising a head stock housing and a tail stock housing, a shaft journalled in said housings, means for rotating the shaft, a head stock disc fixed upon the shaft, a plurality of work receiving chucks rotatably mounted upon the disc, each chuck having a longitudinal bore therethrough, means associated with the shaft for rotating the chucks, a tail stock disc fixed upon the shaft, a plurality of fluid cylinders upon the tail stock disc, rams in said cylinders axially aligned with said chucks, fluid pressure means in the tail stock housing for communication with each cylinder at a predetermined point to operate the ram to push the open end of a hollow sheet metal article over the corresponding chuck, trimming and beading means located at one side of the path of the chucks in positions to act on the open ends of the articles carried by the chucks, suction means in the tail stock housing for communication with each cylinder at a predetermined point beyond the trimming and beading means for withdrawing the rams, and air blast means in the head stock for communication with the longitudinal bores of the chucks for removing the articles from the chucks when the rams are withdrawn.

8. A machine for trimming and beading the edges of hollow sheet metal articles, comprising a head stock housing and a tail stock housing, a shaft journalled in said housings, means for rotating the shaft, a head stock disc fixed upon the shaft, a plurality of work receiving chucks rotatably mounted upon the disc, each chuck having a longitudinal bore therethrough, means associated with the shaft for rotating the chucks, a tail stock disc fixed upon the shaft, a plurality of fluid cylinders upon the tail stock disc, rams in said cylinders axially aligned with said chucks, an arcuate fluid pressure groove in the tail stock housing for communication with each cylinder at a predetermined point to operate the ram to push the open end of a hollow sheet metal article over the corresponding chuck, trimming and beading means located at one side of the path of the chucks in positions to act on the open ends of the articles carried by the chucks, an arcuate suction groove in the tail stock housing for communication with each cylinder at a predetermined point beyond the trimming and beading means for withdrawing the rams, and an arcuate air blast groove in the head stock housing for communication with the longitudinal bores in the chucks for removing the articles from the chucks when the rams are withdrawn.

RICHARD H. HERMAN.

REFERENCES CITED

The following references are of record in the file of this patent:

UNITED STATES PATENTS

| Number | Name | Date |
|---|---|---|
| 888,429 | Skinner | May 19, 1908 |
| 1,485,590 | Brenzinger | Mar. 4, 1924 |
| 1,582,973 | Dodd | May 4, 1926 |
| 1,590,334 | Tevander | June 29, 1926 |
| 1,594,657 | Burns | Aug. 3, 1926 |